United States Patent
McMillan et al.

(10) Patent No.: US 7,070,361 B2
(45) Date of Patent: Jul. 4, 2006

(54) APPARATUS AND METHODS FOR PROVIDING VIV SUPPRESSION TO A RISER SYSTEM COMPRISING UMBILICAL ELEMENTS

(75) Inventors: David Wayne McMillan, Deer Park, TX (US); Donald Wayne Allen, Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/383,155

(22) Filed: Mar. 6, 2003

(65) Prior Publication Data

US 2004/0175240 A1    Sep. 9, 2004

(51) Int. Cl.
*E02D 31/00* (2006.01)
*F15D 1/10* (2006.01)

(52) U.S. Cl. ............. 405/211; 405/212; 166/367; 114/243

(58) Field of Classification Search ........ 405/211, 405/211.1, 212; 166/350, 367, 363, 380; 114/243, 264
See application file for complete search history.

(56) References Cited

U.S. PATENT DOCUMENTS

| | | | | |
|---|---|---|---|---|
| 3,729,756 A | * | 5/1973 | Cook et al. | 166/350 |
| 4,477,207 A | * | 10/1984 | Johnson | 166/350 |
| 5,330,294 A | * | 7/1994 | Guesnon | 166/367 |
| 5,410,979 A | | 5/1995 | Allen et al. | 114/243 |
| 5,421,413 A | | 6/1995 | Allen et al. | 166/335 |
| 5,875,728 A | | 3/1999 | Ayers et al. | 114/264 |
| 6,092,483 A | | 7/2000 | Allen et al. | 114/264 |
| 6,179,524 B1 | | 1/2001 | Allen et al. | 405/211 |
| 6,196,768 B1 | | 3/2001 | Allen et al. | 405/224 |
| 6,223,672 B1 | | 5/2001 | Allen et al. | 114/243 |
| 6,227,137 B1 | | 5/2001 | Allen et al. | 114/264 |
| 6,263,824 B1 | | 7/2001 | Balint et al. | 114/264 |
| 6,309,141 B1 | | 10/2001 | Cox et al. | 405/224 |

(Continued)

FOREIGN PATENT DOCUMENTS

GB      2061452     *  5/1981   ............... 405/211

(Continued)

OTHER PUBLICATIONS

Vortex-Induced Vibration Suppression of Cylindrical Structures, D. W. Allen, Apr., 1994, pp. 1-51.

*Primary Examiner*—Jong-Suk (James) Lee
(74) *Attorney, Agent, or Firm*—William E. Hickman

(57) ABSTRACT

Apparatus for suppressing vortex induced vibrations on a marine element of a riser system wherein the riser system comprises at least one umbilical element. Systems comprising and methods of using said apparatus to suppress vortex induced vibrations. The apparatus, systems, and methods comprise module elements which provide: i) a surface around a marine element for installing VIV suppression devices; and ii) passages for housing the at least one umbilical element.

30 Claims, 3 Drawing Sheets

U.S. PATENT DOCUMENTS

| | | | |
|---|---|---|---|
| 6,419,277 B1 * | 7/2002 | Reynolds | 166/367 |
| 6,551,029 B1 | 4/2003 | Shu et al. | 405/211 |
| 6,561,734 B1 * | 5/2003 | Allen et al. | 114/243 |
| 6,565,287 B1 * | 5/2003 | McMillan et al. | 405/211.1 |
| 6,637,513 B1 * | 10/2003 | van der Poel | 166/350 |
| 6,644,894 B1 | 11/2003 | Shu et al. | 405/211 |
| 6,685,394 B1 | 2/2004 | Allen et al. | 405/211 |
| 6,695,539 B1 | 2/2004 | McMillan et al. | 405/191 |
| 6,702,026 B1 | 3/2004 | Allen et al. | 166/367 |
| 6,886,487 B1 | 5/2005 | Fischer, III | 114/230.1 |
| 2002/0074133 A1 * | 6/2002 | McMillan et al. | 166/380 |
| 2002/0146287 A1 * | 10/2002 | Allen et al. | 405/211 |
| 2003/0068941 A1 * | 4/2003 | Oram | 405/211 |
| 2003/0213113 A1 | 11/2003 | McMillan et al. | 29/281.1 |
| 2004/0175240 A1 | 9/2004 | McMillan et al. | 405/211 |

FOREIGN PATENT DOCUMENTS

| | | | |
|---|---|---|---|
| GB | 2299822 A | 10/1996 | |
| GB | 2315797 A | 2/1998 | |
| JP | 62291304 | * 12/1987 | 405/211 |

* cited by examiner

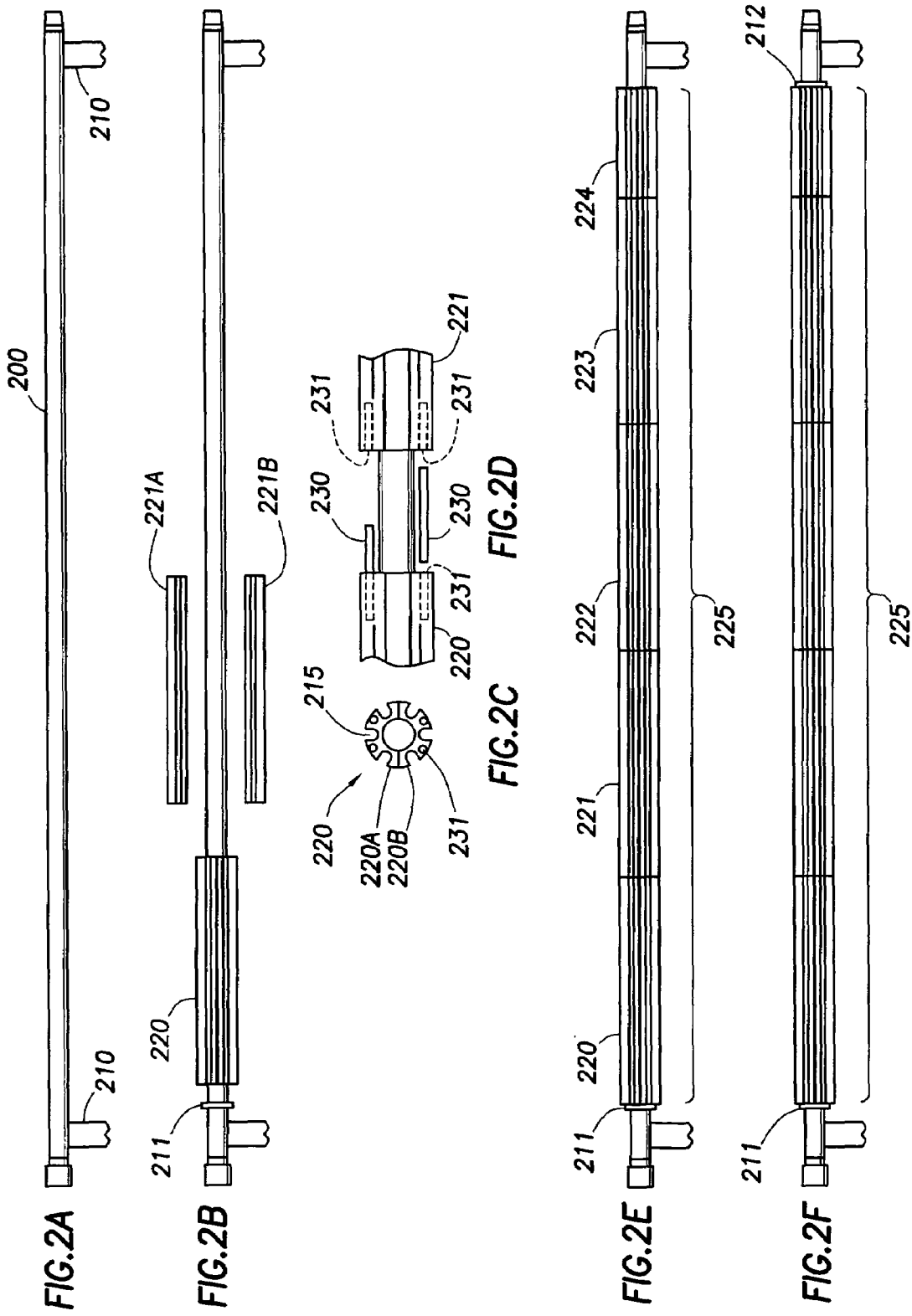

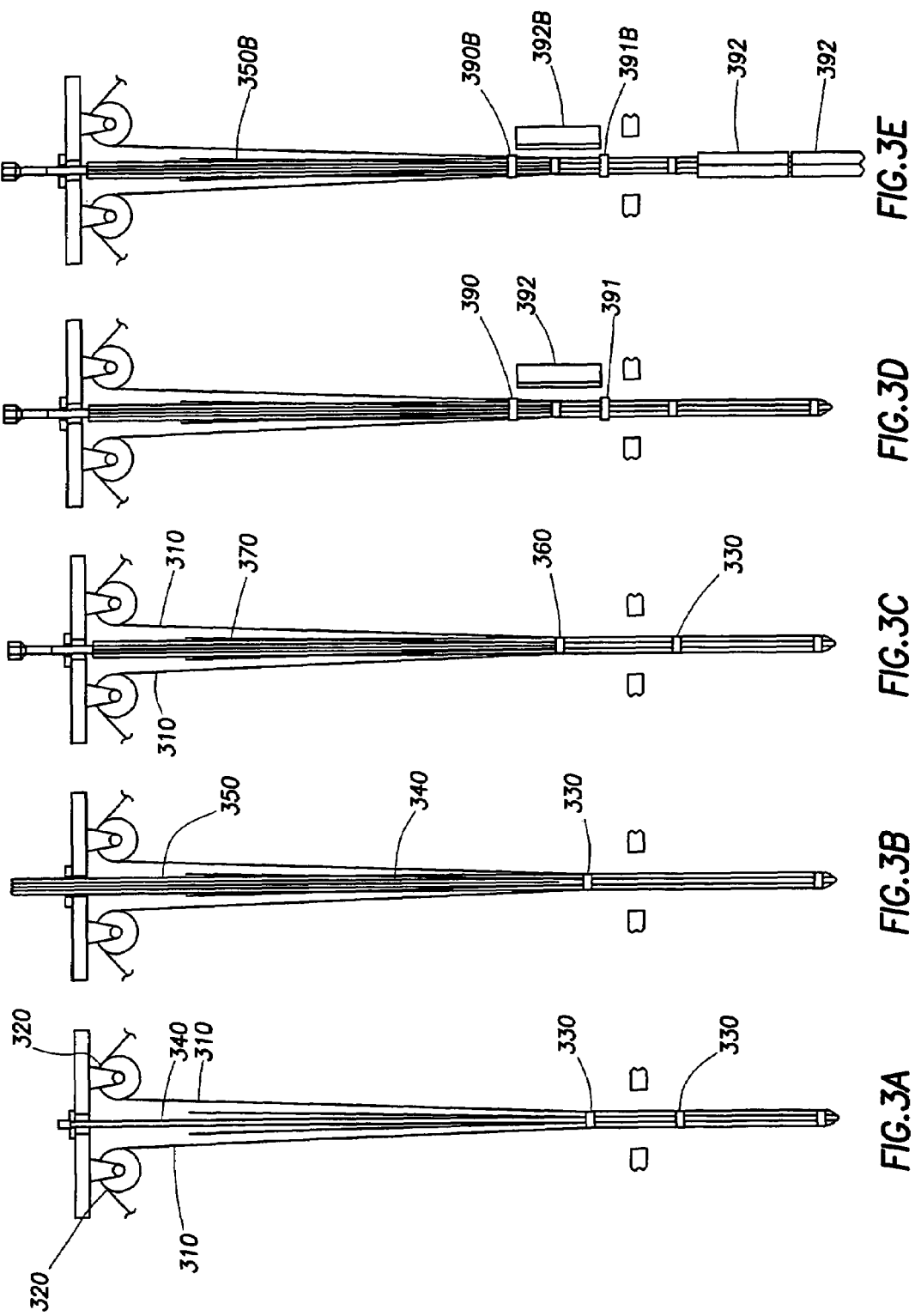

APPARATUS AND METHODS FOR PROVIDING VIV SUPPRESSION TO A RISER SYSTEM COMPRISING UMBILICAL ELEMENTS

BACKGROUND OF THE INVENTION

1. Field of the Invention

The present invention relates to methods and apparatus for suppressing vortex-induced vibrations ("VIV") in flowing-fluid environments. In another aspect, the present invention relates to apparatus and methods for suppressing vortex-induced vibrations of a bluff body in marine environments. In even another aspect, the present invention relates to apparatus and methods for suppressing vortex-induced vibrations of a riser system in a marine environment wherein the system comprises umbilical elements. In still another aspect, the present invention relates to apparatus and methods for suppressing vortex-induced vibrations and protecting umbilical elements of a riser system having multiple umbilical elements. In yet another aspect, the present invention relates to apparatus and methods for suppressing vortex-induced vibrations of a riser system in a marine environment by utilizing modules which provide a surface for attaching VIV suppression devices, and housing for umbilical elements of the system.

2. Description of the Related Art

Whenever a bluff body in a fluid environment, such as a cylinder, is subjected to a current in the fluid, it is possible for the body to experience vortex-induced vibrations (VIV). These vibrations are caused by oscillating hydrodynamic forces on the surface which can cause substantial vibrations of the structure, especially if the forcing frequency is at or near a structural natural frequency. The vibrations are largest in the direction transverse to flow, however, in-line vibrations can also cause stresses which are sometimes larger than those in the transverse direction.

Drilling for and/or producing hydrocarbons or the like from subterranean deposits which exist under a body of water exposes underwater drilling and production equipment to water currents and the possibility of VIV. Equipment exposed to VIV includes structures ranging from the smaller tubes of a riser system, anchoring tendons, or lateral pipelines to the larger underwater cylinders of the hull of a minispar or spar floating production system (a "spar").

Risers as used herein are defined to be a non-exclusive example of a marine element subject to VIV. Generally a riser system is used for establishing fluid communication between the surface and the bottom of a water body. The principal purpose of the riser is to provide a fluid flow path between a drilling vessel and a well bore and to guide a drill string to the well bore.

A typical riser system normally consists of one or more fluid-conducting conduits which extend from the surface to a structure (e.g., wellhead) on the bottom of a water body. For example, in the drilling of a submerged well, a drilling riser usually consists of a main conduit through which the drill string is lowered and through which the drilling mud is circulated from the lower end of the drill string back to the surface. In addition to the main conduit, there are generally provided auxiliary conduits such as, for example, choke and kill lines, pressurized fluid lines, hard pipes, and electrical lines, which extend relatively parallel to the main conduit. These auxiliary conduits and lines are commonly referred to as umbilical elements and/or umbilicals.

There are generally two kinds of water current induced stresses to which all the elements of a riser system are exposed. The first kind of stress as mentioned above is caused by vortex-induced alternating forces that vibrate the underwater structure in a direction perpendicular to the direction of the current. These are referred to as vortex-induced vibrations (VIV). When water flows past the structure, vortices are alternately shed from each side of the structure. This produces a fluctuating force on the structure transverse to the current. If the frequency of this harmonic load is near the resonant frequency of the structure, large vibrations transverse to the current can occur. These vibrations can, depending on the stiffness and the strength of the structure and any welds, lead to unacceptably short fatigue lives. In fact, stresses caused by high current conditions have been known to cause structures such as risers to break apart and fall to the ocean floor.

The second type of stress is caused by drag forces which push the structure in the direction of the current due to the structure's resistance to fluid flow. The drag forces are amplified by vortex induced vibrations of the structure. For instance, a riser pipe that is vibrating due to vortex shedding will disrupt the flow of water around it more so than a stationary riser. This results in greater energy transfer from the current to the riser, and hence more drag.

Many methods have been developed to reduce vibrations of sub sea structures. Some of these methods to reduce vibrations caused by vortex shedding from subsea structures operate by stabilization of the wake. These methods include streamlined fairings, wake splitters and flags. Streamlined or teardrop shaped, fairings that swivel around a structure have been developed that almost eliminate the shedding or vortexes. Wake splitters are flat plates that extend from the back of a cylindrical structure parallel to the current flow direction. These wake splitters have been found to be effective in creating a symmetric vortex pattern so that each vortex "sees" an image created by the rigid splitter plate giving symmetry with respect to the axis in the direction of flow. Splitter plates also stabilize the separation points, decrease the wake width and reduce drag. Flags are similar to wake splitters, but are flexible.

Other conventional methods to reduce vibrations caused by vortex shedding from sub sea structures operate by modifying the boundary layer of the flow around the structure to prevent the correlation of vortex shedding along the length of the structure. Examples of such methods include the use of helical strakes around a structure, or axial rod shrouds and perforated shrouds.

While these conventional suppression methods and apparatus address the suppression of fluid current effects on a riser element, none of them provide protection for the umbilical elements.

Thus, there is a need in the art for apparatus and methods for suppressing VIV.

There is another need in the art for apparatus and methods for suppressing VIV which do not suffer from the disadvantages of the prior art.

There is even another need in the art for apparatus and methods for providing VIV suppression to a riser system comprising umbilical elements and for providing protection to the umbilical elements.

These and other needs of the present invention will become apparent to those of skill in the art upon review of this specification, including its drawings and claims.

SUMMARY OF THE INVENTION

It is one object of the present invention to provide for apparatus and methods for suppressing VIV.

It is another object of the present invention to provide for suppressing VIV which do not suffer from the disadvantages of the prior art.

It is even another object of the present invention to provide apparatus and methods for providing VIV suppression to a riser system comprising umbilical elements and for providing protection to the umbilical elements.

These and other objects of the present invention will become apparent to those of skill in the art upon review of this application, including its drawings and claims.

According to one embodiment of the present invention, there is provided n apparatus for housing umbilical elements of a riser system comprising a cylindrical marine element and at least one umbilical element. Generally the apparatus comprises a substantially tubular module element designed to enclose at least a portion of the circumference of said cylindrical marine element. The substantially tubular module element also comprises at least one longitudinal through passage for housing said umbilical element.

According to another embodiment of the present invention, there is provided a system for suppressing vortex-induced vibration. Generally the system comprises: a) a substantially cylindrical marine element; b) at least one umbilical element positioned in proximity to said cylindrical marine element; and c) an apparatus installed on the marine element. Generally the apparatus comprises a substantially tubular module element comprising at least one longitudinal through passage for housing the umbilical element. The substantially tubular module element encloses at least 180 degrees of the circumference of said marine element.

According to even another embodiment of the present invention, there is provided a method for suppressing vortex-induced vibration of a system comprising a substantially cylindrical marine element and at least one umbilical element. Generally the method comprises the steps of: a) positioning an apparatus on the marine element, wherein the apparatus comprises a substantially tubular module element comprising at least one longitudinal through passage for housing said umbilical element, and wherein the substantially tubular module element encloses at least 180 degrees of the circumference of said marine element.

BRIEF DESCRIPTION OF THE DRAWINGS

FIGS. 2A–2F illustrate a method for installing a multi component module stack of the invention onto a drill riser joint.

FIGS. 3A–3E illustrate a method for securing umbilical elements of a riser system within a module of the invention which has been pre-installed on a riser joint.

DETAILED DESCRIPTION OF THE INVENTION

Figure 1:
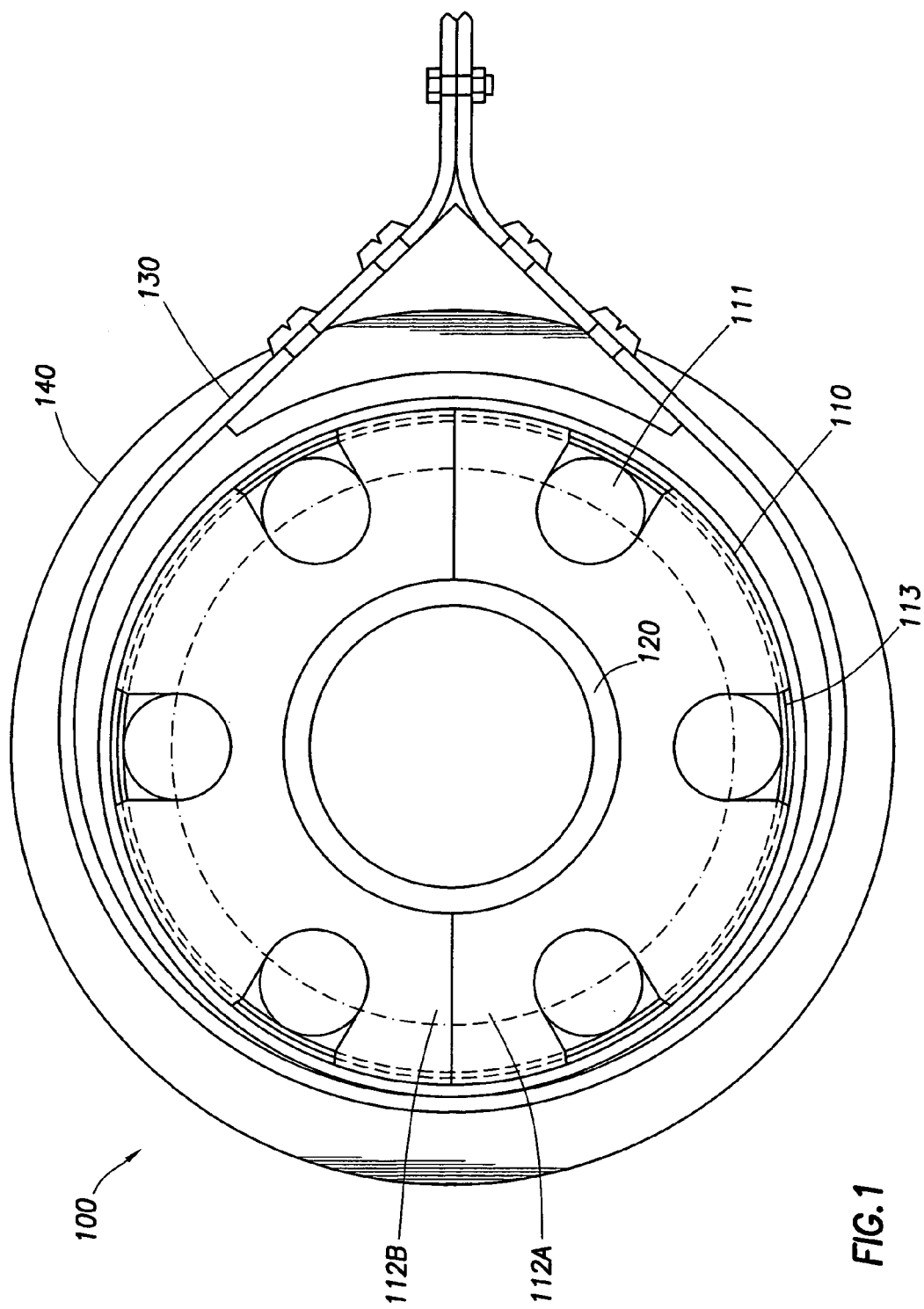
FIG. 1 is a cross sectional view of a fairing positioned around a module of the invention positioned around a riser.

The present invention is directed to apparatus and methods for providing VIV suppression to a riser system comprising umbilical elements. The apparatus of the invention comprise module elements which provide a surface on a marine riser element for installation of VIV suppression devices and also provide housing passages/channels for the umbilical elements of a riser system.

One embodiment of the present invention is directed to an apparatus for housing umbilical elements of a riser system comprising a cylindrical marine element and at least one umbilical element. Generally the apparatus comprises a substantially tubular module element designed to enclose at least a portion of the circumference of the cylindrical marine element, wherein the substantially tubular module element comprises at least one longitudinal through passage for housing said umbilical element. Generally the substantially tubular module element encloses from about 180 degrees to about 360 degrees of the circumference of the cylindrical marine element when positioned thereon. In a preferred embodiment, the longitudinal through passages are "c" shaped in cross-section and substantially tubular module element has four to six of these longitudinal through passages for housing umbilical elements.

Generally the substantially tubular module element is made up from at least two longitudinal sections that are connected to one another. The longitudinal sections may be connected together prior to installation on the marine element. Alternatively, the two sections may be connected to one another after being positioned around the circumference of said cylindrical marine element. The sections may be connected to one another in any fashion such as, for example, in a clam-shell structure and then installed onto the marine element.

A preferred cylindrical marine element is a riser and is thus made up from riser joints. Generally the module element is of a length less than the length of a riser joint, preferably of a length less than one-third the length of a riser joint.

Another embodiment of the present invention is directed to a system for suppressing vortex-induced vibration comprising: a) a substantially cylindrical marine element; b) at least one umbilical element positioned in proximity to said cylindrical marine element; and c) an apparatus of the invention installed on the marine element wherein the apparatus comprises a substantially tubular module element comprising at least one longitudinal through passage for housing said umbilical element. Generally the substantially tubular module element encloses at least 180 degrees of the circumference of said marine element, preferably at least 270 degrees. The system may further comprise d) a vortex-induced vibration suppression device installed on the apparatus.

As described previously, preferably the longitudinal through passages are "c" shaped in cross-section and the substantially tubular module element has four to six of these longitudinal through passages for housing umbilical elements. Generally the substantially tubular module element is made up of at least two longitudinal sections that are connected to one another. The longitudinal sections may be connected together prior to installation on the marine element. Alternatively, the two sections may be connected to one another after being positioned around the circumference of said cylindrical marine element. The sections may be connected to one another in any fashion such as, for example, in a clam-shell structure and then installed onto the marine element.

A preferred cylindrical marine element is a riser and is thus made up from riser joints. Generally the module element is of a length less than the length of a riser joint, preferably of a length less than one-third the length of a riser joint. In a particularly preferred embodiment, each riser joint has three module elements positioned thereon, wherein the module elements are connected to one another in and end-to-end fashion thereby forming a single larger module element wherein their respective longitudinal through passages are in alignment.

Even another embodiment of the present invention is directed to a method for suppressing vortex-induced vibration of a system comprising a substantially cylindrical marine element and at least one umbilical element, the method comprising the step of: a) positioning an apparatus of the invention on a marine element, wherein the apparatus comprises a substantially tubular module element comprising at least one longitudinal through passage for housing said umbilical element and wherein the substantially tubular module element encloses at least 180 degrees of the circumference of said marine element. The method may further comprise the step of: b) securely positioning said umbilical element within said passage. Step b may accomplished by a compression fit of said umbilical within said passage which is preferably "c" shaped in cross-section. The method may even further comprise the step of: c) installing a vortex-induced vibration suppression device on the apparatus.

One embodiment of the present invention will now be described with reference to FIG. 1. Shown in FIG. 1 is a cross sectional view of a module element of the invention. Module element 110 of the invention is installed around riser pipe 120. Module element 110 comprises two module element halves, 112A and 112B, each of which surrounds half the circumference (180 degrees) of riser pipe 120. Module element halves 112A and 112B are fastened together to form module element 110 and to thus fully enclose the circumference of riser 120. Module 110 comprises umbilical housing passages 111 which function to house, secure, and protect the umbilical elements (not shown) of the riser system. Umbilical housing passages 111 span the entire length of module element 110. The umbilical elements are secured within housings ill by tie-wraps 113. Although the embodiment of module 110 shown in FIG. 1 comprises six umbilical housing passages, modules of the invention may comprise any number of passages. Generally, the modules comprise from about 2 to about 12 umbilical housing passages, preferably from about 4 to about 10 passages, more preferably from about 6 to about 8 passages. In a particularly preferred embodiment, the modules comprise 6 passages for housing umbilical elements.

The modules of the invention provide a surface for attaching a VIV suppression device. Still referring to FIG. 1, the VIV suppression device depicted therein is fairing 130 which is held in position by fairing collar 140. Although FIG. 1 depicts a fairing, any VIV suppression device known by one of skill in the art may be utilized in conjunction with the modules of the present invention including, for example, strakes. Preferably, the modules of the invention are used in conjunction with fairings.

A method of installing the module elements onto a riser will now be described with reference to FIGS. 2A–2F. In FIGS. 2A–2F, pre-installation of a multi component module of the invention onto a riser joint is outlined. FIG. 2A depicts bare riser joint 200 on prep rack 210. FIG. 2B depicts riser joint 200 onto which a first module component, module 220, has been assembled. Also shown in FIG. 2B is upper collar 211 which is placed on the upper portion of riser joint 200 in order to prevent module 220 from sliding up riser joint 200. FIG. 2B also illustrates assembly of a second module component, module 221, onto riser joint 200. Module component section 221A and module component section 221B are connected together to form second module component 221. The module sections may be held together by any technique known to one of skill in the art such as, for example, by use of pins, rods, screws, bands, and any combination thereof. In the embodiment shown in FIG. 2, module component sections 221A and 221B each encompass half of the circumference of rise joint 200.

FIG. 2C depicts the cross sectional view of module component 220 which is a single module comprising two module halves, 220A and 220B, wherein each half encompasses half the circumference of rise joint 200. It can be seen that this particular module component embodiment comprises six housings 215 for housing umbilical elements.

As illustrated in FIG. 2D, module component 221 may be keyed to module component 220, thus connecting the two components together. By keying the module elements to one another, the housing passages of one element are aligned with the housing elements of the adjacent module element. In FIG. 2D, components 220 and 221 are illustrated as being held together by rods 230, however, any technique and/or hardware known to one of skill in the art may be used to key the modules to one another. Rods 230 are placed in each of the four connection channels 231 which are visible in the cross section view of FIG. 2C as four tiny holes. Although the module shown in FIG. 2C comprises four connection channels, the modules of the invention may comprise any number of connection channels for keying/connecting the module elements to one another.

Additional module components are then added along the length of the riser joint, as illustrated in FIG. 2E. In this illustration, module components 222, 223 and 224 are added making a total of five module components which are keyed together to form multi component module stack 225. The present invention does not require a specific number of module elements per riser joint as it is noted that the number of module elements a module stack comprises is dependent not only on the length of the riser joint, but also on the length of each of the module elements. Lower collar 212 is then placed on the lower portion of riser joint 200 to prevent multi component module stack 225 from sliding down riser joint 200. Although multi component module stack 225 is secured by collars to prevent movement up or down riser joint 200, generally multi component module stack 225 is capable of rotational movement around the axis of riser joint 200. Thus, with respect to movement, generally the module stack is restricted from moving up and down the riser joint, yet is free to rotate around the axis of the riser joint. This "dressed" riser joint may now be run on a drill string.

As described, generally the module elements are connected to one another thereby producing a multi component module also referred to herein as a module stack or a multi component module stack. The number of module elements a module stack of the invention comprises is dependent on the length of the individual module elements, as well as the length of the riser joint or other marine element onto which the module is to be installed. Although the module elements are connected to one another to create a single multi component module on a single riser joint, it is not necessary to connect the multi component module stack on one riser joint to the multi component module stack on an adjacent riser joint. In other words, because the module elements of a module stack on a single riser joint are connected to one another, their housing passages are in alignment, thus creating housing passages which span the entire length of the multi component module stack. Yet it is not necessary that the housing passages of a module stack on a first riser joint be aligned with the passages of a module stack on a second riser joint. However, in light of this statement, it is important to note that the umbilicals should not be allowed to twist or rotate to the point of causing them undue stress.

Referring now to FIGS. 3A–3E, a method of the invention for housing the umbilical elements of a riser system is illustrated. As shown in FIG. 3A, various umbilical elements 310 to be used in a riser system are fed and guided by sheaves 320. Centralizing collars 330 are used to hold umbilical elements 310 parallel to and in proximity to bare riser joint 340 of the drill string. Dressed riser joint 350 is then added to the drill string, as shown in FIG. 3B. (Dressed riser joint 350 may be prepared as described in FIG. 2.) Dressed riser joint 350 comprises module stack 370, as shown in FIGS. 3B and 3C. Module stack 370 is rotated on dressed riser joint 350 in order to align the housing passages (for passages, see FIG. 1) of module stack 370 with umbilical elements 310 which are held in proximity to bare riser joint 340 by centralizing collar 330. Module stack 370 is then locked onto collar 330 to maintain alignment of module stack 370 with umbilical elements 310 and collar 330. Umbilical elements 310 are then placed in the housing passages (for passages, see FIG. 1, passages 111) of module stack 370 and secured in place by retaining device 360. The retaining device may be any such device known in the art such as, for example, a tie-wrap, or a piece/strip of banding material. The umbilicals are thus securely positioned and protected within the housing passages of the module stack. Generally the retaining devices are expendable elements of the system and are generally cut off and discarded when a riser is pulled.

FIG. 3D depicts the installation of a VIV suppression device. Fairing collar 390 is placed on the lower end of module stack 370 and secured. Fairing collar 391 is then placed an appropriate distance away from fairing collar 390 and secured. Fairing 392 is then installed between collars 390 and 391. The appropriate number of fairing collars and fairings are installed along the length of dressed riser joint 350 in order to provide VIV suppression along the entire length of the riser joint. Depicted in FIG. 2E is dressed riser joint 350B which has been added to the drill string and onto which fairing 392B is being installed between collars 390B and 391B. Although FIG. 3 shows a fairing, the suppression device may be any such device known by one of skill in the art suitable for the specific environment/application and marine element onto which the module stack has been installed.

There are a number of alternatives for the design and attachment/installation of the modules of the invention. For instance, as an alternative to the modules comprising two separate, unconnected halves as depicted in FIGS. 1 and 2, the modules of the invention may be clam-shelled around a riser element wherein the clam shelled module comprises hinges and/or any other alternative latching mechanisms such as snaps, bolts, or other fasteners. Alternatively, the modules may be made comprising a continuous circumference and slid down over an end of a riser element. In addition, the modules of the invention need not be constructed of halves wherein each half encompasses an approximately equal amount of the circumference of a riser pipe as illustrated in FIGS. 1 and 2. Rather, a module that covers more than 180 degrees of the circumference but less than 360 degrees of the circumference (i.e., a C-shaped module) may be made wherein the remaining portion of the circumference is optionally enclosed by a second module piece that completes the circumference. The C-shaped module may be clam-shelled around the riser element using hinges and a latching mechanism, or any other mechanism known by one of skill in the art, or the C-shaped module may be slid over the riser joint. In addition the module and clam-shell pieces need not be two equally sized halves. One piece may cover a large portion of the riser circumference than the remaining piece or pieces.

The module elements and module sections of the invention may be connected to one another, and may be secured around the riser element, using a wide variety of hardware and techniques known in the art. Such hardware includes, for example, latches, receptacles for bolts, pins, rods, rivets, screws, and all other fasteners known in the art. The module sections or parts may also be held together by straps or banding materials. This latter example includes the possibility of providing grooves in the module elements to allow for secure placement of the strapping materials.

With respect to installation of the modules of the invention, the modules may be pre-installed on a marine element. As shown in FIGS. 2A–2F, the modules may be installed on a riser element during installation of the riser element (e.g. while running a drilling riser), or the modules may be installed after the marine element has been installed (a post-installation). Preferably the module elements are pre-installed on the riser joints.

Regarding construction materials, the module elements of the invention may be constructed of any materials suitable for the underwater environment and suitable for supporting VIV suppression devices. Examples of materials suitable for use in manufacturing the module elements of the invention include but are not limited to fiberglass, syntactic foam, and urethane. In addition, the module elements of the invention may be solid, filled, hollow, or any combination thereof. Generally it is desirable for the module elements to provide a low specific gravity and thus to provide buoyancy. It may be desired that the module element provide insulation. It may also be desired that the modules help to reduce top tension.

The size dimensions of the modules of the invention are determined by many factors such as, for example, the size dimensions of the marine element onto which they are to be installed. With respect to the length of the module elements of the invention, the module elements may generally be any length as long as it is less than the length of the riser joint onto which the module is to be installed. For example, for a common riser joint of a length of about 40 feet, generally the module is less than 40 feet in length. Other considerations regarding the size of the module include the cost and ease of manufacturing, handling, transporting and installing the modules. For example, it may be easier to produce, distribute, handle and install three modules on a 40 foot riser joint wherein each module is about 8 to about 10 feet in length, as opposed to a single long module of from about 24 to about 36 feet in length. Generally the module elements of the invention are between about 0.5 and about 15 feet in length, preferably between about 1 and 14 feet in length, and more preferably between about 1.5 and about 12 feet in length. With respect to thickness, the modules may be any thickness which provides the necessary strength to the module without impeding the functions of the module. The diameter of the module is dependent upon, at least, the marine element on which it is to be installed. The inner diameter of the module should be greater than the outer diameter of the marine element onto which it is to be installed. Generally the module fits around the marine riser element without an abundance or excess of space between the two. For example, for a riser joint having a 10 inch outer diameter, an appropriate inner diameter for the module is about 11 inches.

Regardless of the design of the module elements, or the method in which they are installed, or the material from which they are constructed, or the module element's size, a critical aspect of the modules of the invention is that they comprise housing passages or channels for housing the umbilical elements of a riser system. Thus, the modules of the invention not only provide a surface for attachment of VIV suppression devices, but they also provide housing passages or channels which serve to secure and protect the umbilical elements.

Generally these umbilical housing passages are of a diameter suitable to house any umbilical elements used in a riser system. Generally the inner diameter of the housing passage is greater than about 1 inch, preferably greater than about 3 inches, more preferably greater than about 5 inches. The umbilicals may be secured within the passage(s) by use of tie-wraps, bands, straps, or any other restraining device known by one of skill in the art, as long as the umbilicals do not come out of the passage(s). Alternatively, or in addition, the umbilicals may be held within the passages simply due to the shape of the passage. That is, the umbilicals may be secured within the passage by virtue of a compression fit of the umbilical within the passage. This compression fit passage allows one to "snap" the umbilicals securely into the passage(s). The cross-sectional view of such a compression fit passage may resemble a letter C (i.e., a "c" shape). In a particularly preferred embodiment, the umbilical elements are held within the housing passages by compression fit.

Although the shapes of the housing passages illustrated in FIGS. 1 and 2 are circular, the shape may be any shape suitable for the purpose of housing umbilical elements. Non-limiting examples of suitable shapes include any regular or irregular n-sided geometric shape, or any linear or curvilinear geometric shape. Specific non-limiting examples include square, rectangle, triangle, circle, oval, ellipsoid, or the like, and any combinations thereof. Preferably the shape of the housing passage is curvilinear such as circular, oval, or ellipsoid.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. An apparatus for housing umbilical elements of a riser system comprising a cylindrical marine element and at least one umbilical element, wherein the apparatus comprises a substantially tubular module element, the module element is designed to at least partially enclose the circumference of said cylindrical marine element, wherein said module element is substantially tubular and comprises an inner surface and an outer surface wherein both surfaces are curvilinear, wherein said outer surface is contiguous and has at least one umbilical housing passage which forms a channel for housing a portion of said umbilical element;

a vortex induced vibration suppression device selected from the group consisting of a strake and a fairing, the vortex induced vibration suppression device installed about said outer surface of said module element.

2. The apparatus of claim 1 wherein said module element encloses from about 180 degrees to about 360 degrees of said circumference of said cylindrical marine element when positioned thereon.

3. The apparatus of claim 2 wherein said module element is comprised of two longitudinal sections connected to one another.

4. The apparatus of claim 3 wherein said outer surface of said module element has at least four umbilical housing passages.

5. The apparatus of claim 4 wherein said cylindrical marine element is a riser comprising riser joints, and wherein said module element has a length less than the length of a riser joint.

6. The apparatus of claim 5 wherein said module element has a length less than one-third the length of a riser joint.

7. The apparatus of claim 3 wherein said sections are connected together in a clam-shell structure.

8. The apparatus of claim 3 wherein said two sections are connected to one another after being positioned around the circumference of said cylindrical marine element.

9. The apparatus of claim 4 wherein said umbilical housing passages are "c" shaped in cross-section.

10. A system for suppressing vortex-induced vibration comprising:
   a. a substantially cylindrical marine element;
   b. at least one umbilical element wherein a portion of said umbilical element runs alongside a portion of said cylindrical marine element; and
   c. an apparatus installed on any part of said portion of said marine element, wherein said apparatus is a substantially tubular and comprises an inner surface and an outer surface, wherein both surfaces are curvilinear, wherein said outer surface is contiguous and has at least one umbilical housing passage which forms a channel for housing a part of said portion of said umbilical element, wherein said apparatus encloses at least 180 degrees of the circumference of said marine element;
   d. a vortex-induced vibration suppression device selected from the group consisting of a strake and a fairing, the vortex induced vibration suppression device installed about said outer surface of said apparatus.

11. The system of claim 10 wherein said apparatus encloses at least 270 degrees of the circumference of said cylindrical marine element.

12. The system of claim 11 wherein said apparatus comprises two longitudinal sections connected to one another.

13. The system of claim 12 wherein said outer surface comprises at least four umbilical housing passages.

14. The system of claim 13 wherein said cylindrical marine element is a riser comprising riser joints, and wherein said apparatus is of a length less than the length of one of said riser joints.

15. The system of claim 14 wherein said apparatus is of a length less than one-third the length of one of said riser joints.

16. The system of claim 13 wherein said sections are connected together in a clam-shell structure.

17. The system of claim 13 wherein said two sections are connected to one another after being positioned around the circumference of said marine element.

18. The system of claim 13 wherein said umbilical housing passages are "c" shaped in cross-section.

19. A method for suppressing vortex-induced vibration of a system comprising a substantially cylindrical marine element and at least one umbilical element, wherein a portion of said umbilical element runs alongside a portion of said marine element, the method comprising:
   a. installing an apparatus on said marine element, wherein said apparatus is substantially tubular and comprises an inner surface and an outer surface, wherein both surfaces are curvilinear, wherein said outer surface is contiguous and has at least one umbilical housing passage which forms a channel for housing a part of said portion of said umbilical element, wherein installing results in said apparatus enclosing at least 180 degrees of the circumference of said marine element; and b. installing a vortex-induced vibration suppression device selected from the group consisting of a strake and a fairing, about said outer surface of said apparatus.

20. The method of claim 19 wherein said apparatus encloses at least 270 degrees of the circumference of said cylindrical marine element.

21. The method of claim 20 wherein said apparatus comprises two longitudinal sections connected to one another.

22. The method of claim 21 wherein said outer surface comprises at least four umbilical housing passages.

23. The method of claim 22 wherein said cylindrical marine element is a riser comprising riser joints, and wherein said apparatus is of a length less than the length of one of said riser joints.

24. The method of claim 23 wherein said apparatus is of a length less than one-third the length of one of said riser joints.

25. The method of claim 22 wherein said sections are connected together in a clam-shell structure.

26. The method of claim 22 wherein said two sections are connected to one another after being positioned around the circumference of said marine element.

27. The method of claim 22 wherein said umbilical housing passages are "c" shaped in cross-section.

28. The method of claim 22 wherein said installing of said apparatus is carried out during pre-installation of said marine element.

29. The method of claim 28 further comprising the step of:

b. securely positioning said part of said umbilical element within said channel.

30. The method of claim 29 wherein securely positioning of step b is accomplished by a compression fit of said part of said umbilical within said channel.

* * * * *